(12) United States Patent
Cha et al.

(10) Patent No.: US 12,227,119 B2
(45) Date of Patent: Feb. 18, 2025

(54) STORAGE VEHICLE FOR SMALL MOBILITY

(71) Applicants: Hyundai Motor Company, Seoul (KR); Kia Corporation, Seoul (KR)

(72) Inventors: Dong Eun Cha, Gyeonggi-Do (KR); Sang Heon Lee, Seoul (KR); Jin Ho Hwang, Chungcheongnam-Do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 444 days.

(21) Appl. No.: 17/694,250

(22) Filed: Mar. 14, 2022

(65) Prior Publication Data

US 2023/0022812 A1 Jan. 26, 2023

(30) Foreign Application Priority Data

Jul. 15, 2021 (KR) .......................... 10-2021-0092660

(51) Int. Cl.
*B60P 3/073* (2006.01)
*B60R 5/00* (2006.01)
(Continued)

(52) U.S. Cl.
CPC ................ *B60P 3/073* (2013.01); *B60R 5/00* (2013.01); *B60R 16/03* (2013.01); *B60L 53/30* (2019.02); *B60L 2200/12* (2013.01); *B60L 2200/24* (2013.01); *B60P 3/07* (2013.01); *B60R 7/043* (2013.01); *B60R 7/046* (2013.01); *B60R 11/00* (2013.01); *B60R 2011/0012* (2013.01);
(Continued)

(58) Field of Classification Search
CPC ... B60P 3/073; B60P 3/07; B60R 5/00; B60R 16/03; B60R 11/00; B60R 2011/0012; B60R 7/046; B60R 7/043; B60R 2011/0021; B60L 53/30; B60L 2200/12; B60L 2200/24; E05F 15/616; E05Y 2900/544; B60Y 2200/91
USPC .............................................. 296/37.15, 24.3
See application file for complete search history.

(56) References Cited

U.S. PATENT DOCUMENTS

| 4,917,430 | A | | 4/1990 | Lawrence | |
| 5,895,086 | A | * | 4/1999 | Carico | ................... B60R 11/06 296/37.6 |

(Continued)

FOREIGN PATENT DOCUMENTS

| DE | 102012018219 | 3/2014 |
| DE | 102017216356 | 5/2018 |

(Continued)

*Primary Examiner* — Amy R Weisberg
*Assistant Examiner* — Dana D Ivey
(74) *Attorney, Agent, or Firm* — Morgan, Lewis & Bockius LLP

(57) ABSTRACT

A storage vehicle for a mobility includes a seat provided inside the storage vehicle and spaced from a floor of the storage vehicle upward to form a separation space below the seat; a storage slot formed in the separation space below the seat, opened to an external side of the storage vehicle through a portion of a sidewall of the storage vehicle, and configured to store the mobility therein; a door provided in the opening portion of the storage slot; and an opening/closing portion provided on a side of the door and configured to operate the door upward or downward to open or close an opening portion of the storage slot.

15 Claims, 5 Drawing Sheets

(51) Int. Cl.
  *B60R 16/03*  (2006.01)
  *B60L 53/30*  (2019.01)
  *B60P 3/07*  (2006.01)
  *B60R 7/04*  (2006.01)
  *B60R 11/00*  (2006.01)
  *E05F 15/616*  (2015.01)

(52) U.S. Cl.
  CPC ... *B60R 2011/0021* (2013.01); *B60Y 2200/91* (2013.01); *E05F 15/616* (2015.01); *E05Y 2900/544* (2013.01)

(56) References Cited

U.S. PATENT DOCUMENTS

| | | | |
|---|---|---|---|
| 7,086,689 B2 * | 8/2006 | Dean | B62D 33/027 296/182.1 |
| 7,219,941 B1 | 5/2007 | San Paolo et al. | |
| 10,479,258 B2 * | 11/2019 | Souschek | B62K 15/006 |
| 2018/0069416 A1 | 3/2018 | Brace et al. | |
| 2020/0062185 A1 * | 2/2020 | Scaringe | B60R 16/023 |

FOREIGN PATENT DOCUMENTS

| | | |
|---|---|---|
| DE | 102018221384 | 6/2020 |
| DE | 102021105526 | 3/2022 |
| KR | 10-2020-0026493 | 3/2020 |
| KR | 10-2021-0014985 | 2/2021 |
| KR | 10-2233272 | 3/2021 |

* cited by examiner

<X - X>

STORAGE VEHICLE FOR SMALL MOBILITY

CROSS REFERENCE TO RELATED APPLICATION

The present application claims priority to Korean Patent Application No. 10-2021-0092660 filed on Jul. 15, 2021, the entire contents of which is incorporated herein for all purposes by this reference.

BACKGROUND OF THE INVENTION

Field of the Invention

The present invention relates to a storage vehicle for a small mobility, which allows a small mobility, on which a passenger rides, to be stored in an internal space of a storage vehicle and used again when the passenger gets off the storage vehicle and transfers from the small mobility to the storage vehicle and allows the small mobility to be stored in a storage slot below a passenger's seat to charge a battery.

Description of Related Art

Recently, the number of users of electric kickboards has soared, and related services are also becoming an issue. In general, the electric kickboard is provided with two wheels and a scaffold on which a passenger can stand at a lower end portion and a handle for operation at a front side and has an advantage in that anyone can easily use the electric kickboard in a simplified operation method.

Such a small mobility has an advantage capable of easily moving a short distance before or after using a vehicle or public transportation. However, currently, except for a personal small mobility, the small mobility is mostly used through a shared service, and after being deployed at several positions, a passenger utilizes the small mobility and then directly returns the small mobility to a place at which the use of the small mobility is terminated. In the instant case, after the passenger utilizes a vehicle, when a small mobility is required at an arrival location or when there is no small mobility at a place at which the passenger wants to board the small mobility or there are many users, there is a disadvantage in that the small mobility cannot be used.

Therefore, to allow the passenger to use the small mobility or the vehicle together, it is necessary to develop a storage vehicle for the small mobility, which stores the small mobility in the vehicle after using or withdraws the small mobility from the vehicle to allow the passenger to use the small mobility.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a storage vehicle for a mobility, which allows a passenger to store the used mobility in an internal space of a storage vehicle and to use the mobility again when the passenger gets off the storage vehicle and transfers from the mobility to the storage vehicle, in which a storage slot configured for storing the mobility is formed in the internal space of the storage vehicle, in which the passenger rides, using a space below a seat and the mobility is stored in the storage slot on a lower end portion of a passenger seat and thus a battery of the mobility is charged.

According to one aspect, there is provided a storage vehicle for a mobility, which includes a seat provided inside the storage vehicle and spaced from a floor of the storage vehicle upward to form a separation space below the seat; a storage slot formed in the separation space below the seat, opened to an external side of the storage vehicle through a portion of a sidewall of the storage vehicle, and configured to store the mobility therein; a door provided in the opening portion of the storage slot; and an opening/closing portion provided on a side of the door and configured to operate the door upward or downward to open or close an opening portion of the storage slot.

The seat may be disposed to direct a seatback to face the external side of the storage vehicle, the seatback may be located at a position spaced from the sidewall of the storage vehicle to form an interspace between the seatback and the sidewall of the storage vehicle, and a separation space, which is formed so that a seat cushion is spaced from the floor of the storage vehicle upward, may be connected to the interspace.

The storage slot may be provided in each of the separation space and the interspace; when the mobility is stored, a scaffold of the mobility may be located in the separation space; and a handle of the mobility may be located in the interspace.

The door may be provided on the sidewall of the storage vehicle to form a portion of the sidewall and have a shape extending from an upper end portion of the seat to the floor of the vehicle.

The opening/closing portion may include an actuator provided at an upper end portion of the door, and as the actuator is rotated in a first direction or a second direction, the door may slide upward or downward to open or close the opening portion.

The actuator may be coupled to the door through a support extending from the actuator and connected on a center portion of the door, and the support may push the door to the external side of the storage vehicle to slide the door upward according to a rotation of the actuator or pull the door to an internal side of the storage vehicle to slide the door downward.

An auxiliary storage portion may be provided at a lower end portion of the opening portion of the storage slot, and when the door is opened, the auxiliary storage portion may connect the floor of the storage vehicle to the ground to assist storage of the mobility into the storage slot or withdrawal of the mobility out of the storage slot.

The auxiliary storage portion may have a plate shape protruding from a lower end portion of the opening portion to the upper end portion thereof, one end portion of the auxiliary storage portion may be rotatably coupled to the floor, and the other end portion thereof may be supported on the ground when rotated.

An elastic member may be provided on an end portion of the auxiliary storage portion toward the floor, and when the door is opened, the auxiliary storage portion may be rotated to the external side of the storage vehicle due to an elastic force of the elastic member so that the other end portion of the auxiliary storage portion may be supported on the ground.

The door may include an upper end portion and a lower end portion, the opening/closing portion may slide the upper end portion of the door upward or downward, and when the upper end portion of the door slides upward, the lower end portion of the door may be rotated to the external side of the storage vehicle to connect the floor of the storage vehicle to the ground, assisting storage or withdrawal of the mobility.

The door may be provided to be rotatable based on one side thereof, and the opening/closing portion may rotate the door in a lateral direction to open or close the opening portion of the storage slot.

A fixing portion may be provided at a lower end portion of the storage slot, and when the mobility is stored in the storage slot, the fixing portion may fix a lower end portion of the mobility, and when the opening portion is opened, the fixing portion releases the fixing.

When the mobility is stored in the storage slot, the fixing portion may lock wheels or a scaffold of the mobility to fix the mobility.

A charging portion may be provided in the storage slot, and when the mobility is stored in the storage slot, the charging portion may charge a battery of the mobility.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
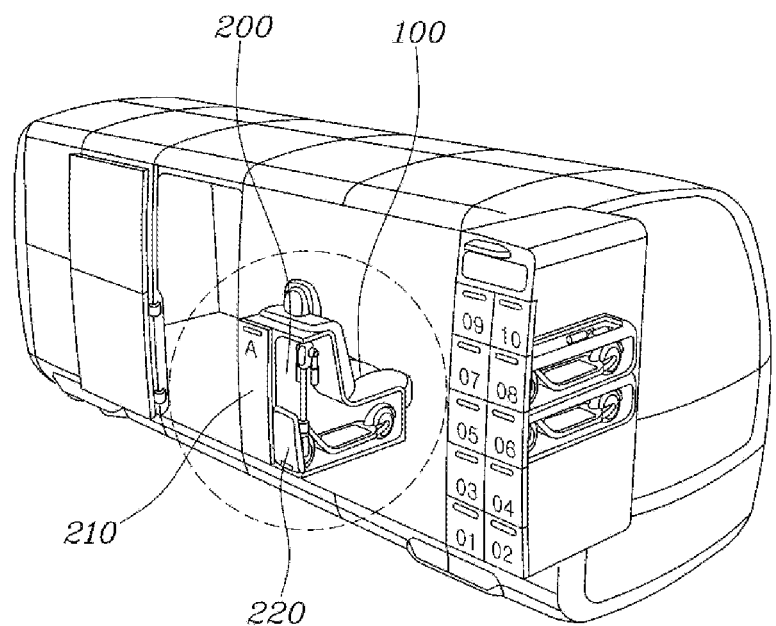
FIG. 1 is a diagram illustrating a storage vehicle for a small mobility according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 2:
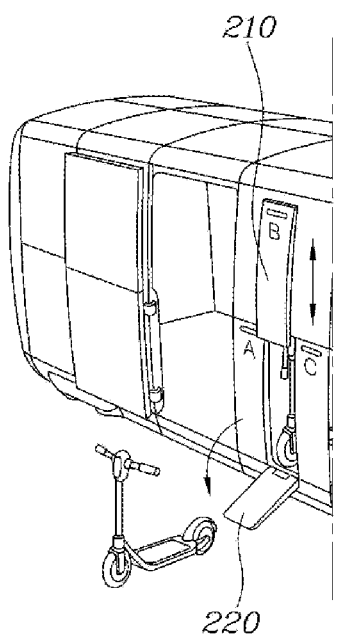
FIG. 2 is a diagram illustrating that a storage slot is opened in the storage vehicle for a small mobility and the small mobility stored in the storage slot is withdrawn from the storage slot according to various exemplary embodiments of the present invention.
Figure 3A:
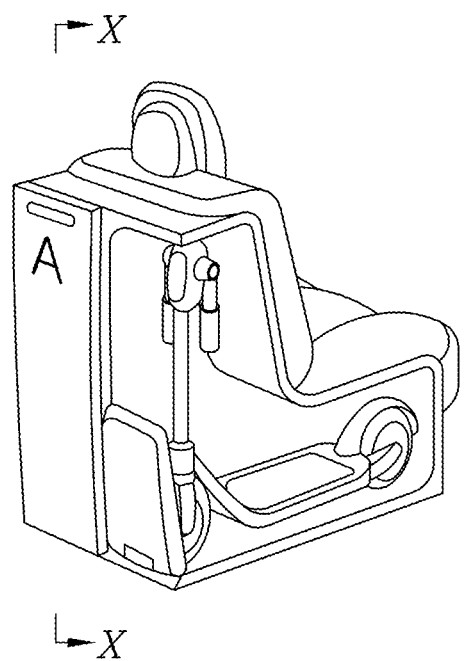
FIG. 3A and FIG. 3B are diagrams illustrating the storage slot formed at a lower end portion of a seat in the storage vehicle for a small mobility according to various exemplary embodiments of the present invention.
Figure 3B:
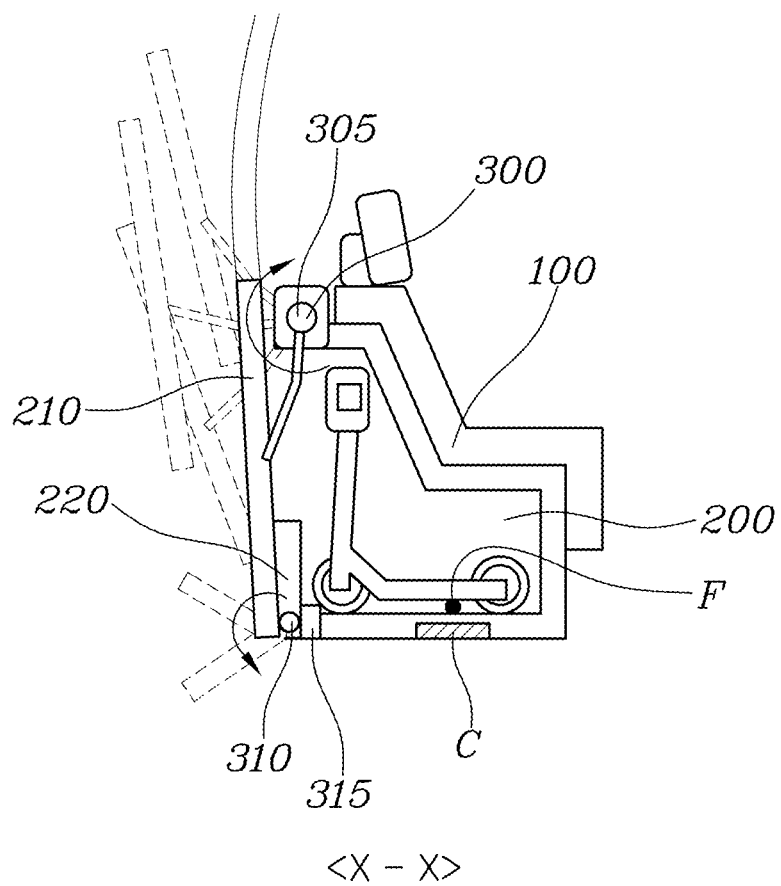
Figure 4A:
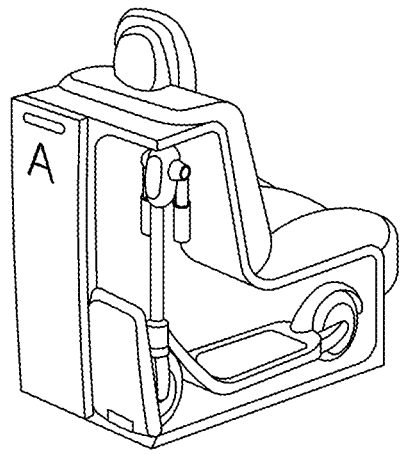
FIG. 4A, FIG. 4B and FIG. 4C are diagrams illustrating various examples of a door in the storage vehicle for a small mobility according to various exemplary embodiments of the present invention.
Figure 4B:
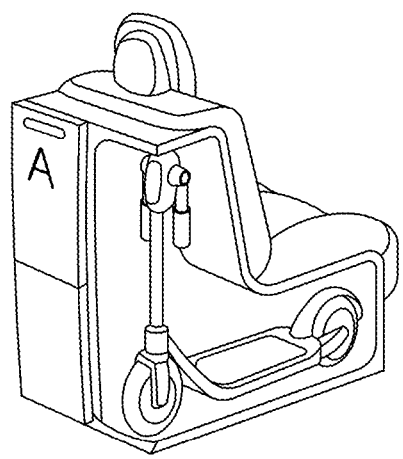
Figure 4C:
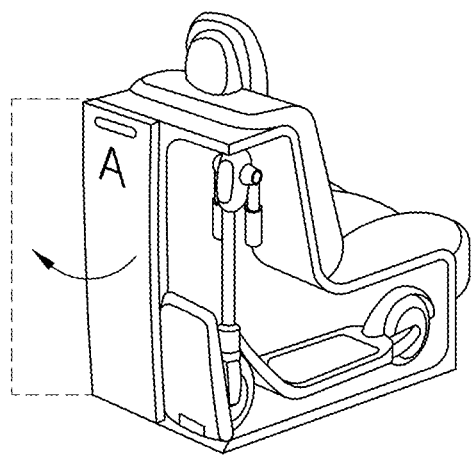
Figure 5:
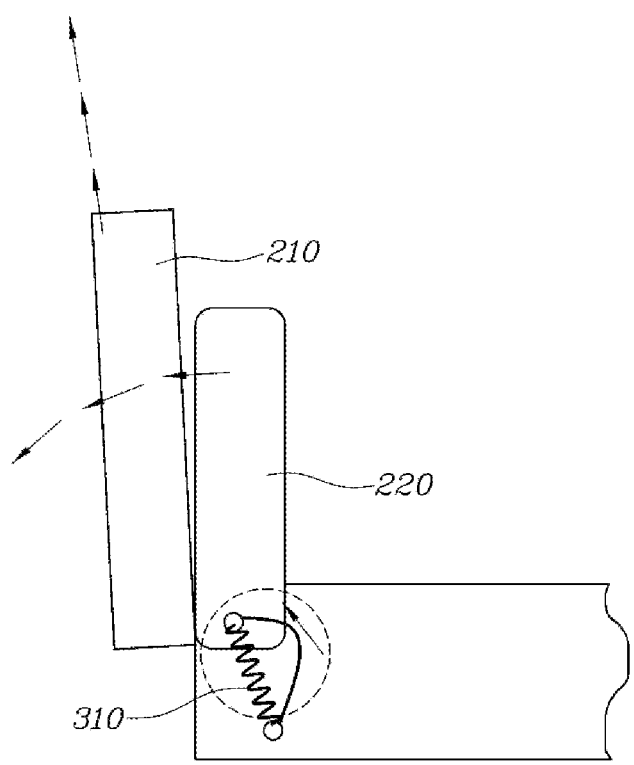
FIG. 5 is a diagram illustrating an operation of an auxiliary storage portion in the storage vehicle for a small mobility according to various exemplary embodiments of the present invention.

FIG. 1 is a diagram illustrating a storage vehicle for a small mobility according to various exemplary embodiments of the present invention. FIG. 2 is a diagram illustrating that a storage slot is opened in the storage vehicle for a small mobility and the small mobility stored in the storage slot is withdrawn from the storage slot according to various exemplary embodiments of the present invention. FIG. 3A and FIG. 3B are diagrams illustrating the storage slot formed at a lower end portion of a seat in the storage vehicle for a small mobility according to various exemplary embodiments of the present invention. FIG. 4A, FIG. 4B and FIG. 4C are diagrams illustrating various examples of a door in the storage vehicle for a small mobility according to various exemplary embodiments of the present invention. FIG. 5 is a diagram illustrating an operation of an auxiliary storage portion in the storage vehicle for a small mobility according to various exemplary embodiments of the present invention.

FIG. 1 is a diagram illustrating a storage vehicle for a small mobility according to various exemplary embodiments of the present invention. The storage vehicle for a small mobility according to various exemplary embodiments of the present invention includes a seat 100 provided in a vehicle, disposed to direct a seatback to face an external side of the storage vehicle, and spaced from a floor of the storage vehicle upward to form a separation space downward, a storage slot 200 formed in the separation space below the seat 100, opened to the external side of the storage vehicle through a portion of a sidewall of the storage vehicle, and configured to store the small mobility, a door 210 provided in the opening portion of the storage slot 200, and an opening/closing portion 300 provided on one side of the door 210 and configured to operate the door 210 upward or downward to open or close the opening portion of the storage slot 200.

The storage vehicle for a small mobility according to various exemplary embodiments of the present invention is a storage vehicle provided with the storage slot 200 in which the small mobility is stored, and a passenger may ride in an internal space of the storage vehicle and move to a destination, and before and after boarding the storage vehicle, use the small mobility stored in the storage slot 200, easily transferring between the small mobility and the vehicle.

Furthermore, since the storage slot 200 in which the small mobility is stored utilizes an empty space at a lower end portion of the seat 100 in the internal space of the storage vehicle, it is efficient in terms of space utilization. Since the storage slot 200 utilizes a space formed along a seat back and a seat cushion of the seat 100, the small mobility such as an electric kickboard is directly stored in the storage slot 200 without being folded or deformed so that storage and withdrawal may also be performed easily and rapidly.

FIG. 2 is a diagram illustrating that the storage slot is opened in the storage vehicle for a small mobility and the small mobility stored in the storage slot is withdrawn from the storage slot according to various exemplary embodiments of the present invention. FIG. 3A and FIG. 3B are diagrams illustrating the storage slot formed at a lower end portion of a seat in the storage vehicle for a small mobility according to various exemplary embodiments of the present invention. In the storage vehicle for a small mobility according to various exemplary embodiments of the present invention, the seat 100 is disposed to direct the seatback to face the external side of the storage vehicle, and the seatback is located at a position spaced from the sidewall of the storage vehicle so that an interspace may be formed between the sidewall and the seatback of the storage vehicle, and the separation space formed by the seat cushion being spaced upwards from the floor may be connected to the interspace.

Furthermore, in the storage vehicle for a small mobility according to various exemplary embodiments of the present invention, the storage slot 200 is provided in the separation space and the interspace, and when the small mobility is stored, a scaffold of the small mobility may be located in the separation space and a handle of the small mobility may be located in the interspace. Therefore, the small mobility may be directly stored in the storage slot 200 without folding the handle and the scaffold, and the small mobility is folded and stored, as necessary, so that other luggage may be stored in the storage slot 200.

Meanwhile, in the storage vehicle for a small mobility according to various exemplary embodiments of the present invention, the door 210 may be provided on the sidewall of the storage vehicle to form a portion of the sidewall and may have a shape extending from an upper end portion of the seat 100 to the floor of the vehicle.

Furthermore, in the storage vehicle for a small mobility according to various exemplary embodiments of the present invention, the opening/closing portion 300 includes an actuator provided on an upper end portion of the door 210, and as the actuator rotates in one direction or the other direction, the door 210 slides upward or downward so that an opening portion may be opened and closed.

In the storage vehicle for a small mobility according to various exemplary embodiments of the present invention, the actuator may be coupled to the door 210 through a support 320 extending downwardly from the actuator and supported on a center portion of the door 210, and the support 320 may push the door 210 to the external side of the storage vehicle according to the rotation of the actuator to slide the door 210 upward or pull the door 210 to an internal side of the storage vehicle according to the rotation of the actuator to slide the door 210 downward.

In an exemplary embodiment of the present invention, the actuator may include a step motor 305.

FIG. 5 is a diagram illustrating an operation of an auxiliary storage portion in the storage vehicle for a small mobility according to various exemplary embodiments of the present invention. In the storage vehicle for a small mobility according to various exemplary embodiments of the present invention, an auxiliary storage portion 220 is provided at a lower end portion of the opening portion of the storage slot 200, and when the door 210 is opened, the auxiliary storage portion 220 may connect the floor of the storage vehicle to the ground to assist storage of the small mobility into the storage slot or withdrawal of the small mobility out of the storage slot.

In the storage vehicle for a small mobility according to various exemplary embodiments of the present invention, the auxiliary storage portion 220 has a shape of plate protruding from the lower end portion of the opening portion to an upper end portion thereof, and one end portion of the auxiliary storage portion 220 may be rotatably coupled to the floor and the other end portion thereof may be supported on the ground when rotated. Furthermore, in the storage vehicle for a small mobility according to various exemplary embodiments of the present invention, an elastic member 310 is provided on an end portion of the auxiliary storage portion 220 toward the floor, and when the door 210 is opened, the auxiliary storage portion 220 may be rotated to the external side of the storage vehicle due to an elastic force of the elastic member 310 and the other end portion of the auxiliary storage portion 220 may be supported on the ground.

That is, the auxiliary storage portion 220 is configured as a bridge for connecting the ground to the floor of the storage vehicle, and thus the passenger does not lift the small mobility separately from the ground and store the small mobility in the storage slot 200, but wheels of the small mobility are easily and naturally stored in or withdrawn from the auxiliary storage portion 220.

Meanwhile, referring to FIG. 3A and FIG. 3B, step motors 305 and 315 may be provided at an upper end portion and the lower end portion of the opening portion, and the door 210 may be pushed to the external side of the storage vehicle to slide upward through control of the step motor 305 at the upper end portion of the opening portion or may be pulled to the internal side of the storage vehicle to slide downward. Furthermore, the step motor 315 at the lower end portion of the opening portion may be connected to the auxiliary storage portion 220 to rotate the auxiliary storage portion 220.

Through the control of the step motors 305 and 315 as described above, when the passenger transmits a usage request signal from a personal terminal to a server of the storage vehicle before boarding, after the storage vehicle is stopped, the server of the storage vehicle may control to sequentially apply power to the step motor 305 at the upper end portion of the opening portion and the step motor 315 at the lower end portion thereof and drive the step motors 305 and 315 to open the door 210 of the storage slot 200 which is empty. After the passenger fixes the small mobility to a fixing portion of the small mobility and then transmits a usage termination signal to the server of the storage vehicle, the server of the storage vehicle may control to sequentially apply power to the step motor 305 at the upper end portion of the opening portion and the step motor 315 at the lower end portion thereof and drive the step motors 305 and 315 to close the door 210.

Furthermore, when the passenger gets off and when the passenger transmits a get-off and usage request signal to the server of the storage vehicle through the personal terminal of the passenger or a control unit in the storage vehicle, after the storage vehicle is stopped, the doors 210 of the used storage slots 200 may be controlled to be sequentially opened. After the passenger releases the fixing of the small mobility, terminates the recovery of the small mobility, and transmits a usage termination signal to the server of the storage vehicle, the door 210 may be controlled to be closed before the storage vehicle departs.

FIG. 4A, FIG. 4B and FIG. 4C are diagrams illustrating various examples of the door in the storage vehicle for a small mobility according to various exemplary embodiments of the present invention. Referring FIG. 4A, FIG. 4B and FIG. 4C, in the storage vehicle for a small mobility according to various exemplary embodiments of the present invention, the door 210 may be configured as shown in FIG. 4A, FIG. 4B and FIG. 4C. In the storage vehicle for a small mobility according to various exemplary embodiments of the present invention, the door 210 includes an upper end portion and a lower end portion, and the opening/closing portion 300 slides the upper end portion of the door 210 upward or downward, and when the upper end portion of the door 210 slides upward, the lower end portion of the door 210 may be rotated to the external side of the storage vehicle to connect the floor of the storage vehicle to the ground, assisting storage or withdrawal of the small mobility. The above description corresponds to FIG. 4B. In the instant case, the lower end portion of the door 210 is configured as the auxiliary storage portion 220 without a separate component for the auxiliary storage portion 220.

Furthermore, in the storage vehicle for a small mobility according to various exemplary embodiments of the present invention, the door 210 is rotatably provided based on one side thereof, and the opening/closing portion 300 may rotate the door 210 in a lateral direction to open or close the opening portion of the storage slot 200. The above description corresponds to FIG. 4C. As described above, the door 210 may open or close the opening portion of the storage slot 200 in various manners and various shapes.

Meanwhile, in the storage vehicle for a small mobility according to various exemplary embodiments of the present invention, a fixing portion(F) is provided at a lower end portion of the storage slot 200. When the small mobility is stored in the storage slot 200, the fixing portion(F) may fix a lower end portion of the small mobility, and when the opening portion is opened, the fixing portion(F) may release the fixing. When the small mobility is stored in the storage slot 200, the fixing portion(F) may lock the wheels or the scaffold of the small mobility to fix the small mobility.

Furthermore, in the storage vehicle for a small mobility according to various exemplary embodiments of the present invention, a charging portion(C) is provided in the storage slot 200. When the small mobility is stored in the storage slot 200, the charging portion(C) may charge a battery of the small mobility. Consequently, even when the passenger does not separately charge the small mobility, while moving using the storage vehicle, the passenger may be able to charge the battery of the small mobility, and after using the storage vehicle, the passenger may use the small mobility again in which the battery is charged.

The storage vehicle for a small mobility according to various exemplary embodiments of the present invention may have various effects in that, when the usage of the storage vehicle is not possible, the PBV is used as a storage space in a situation of bad weather of snow, rain, and the like in a condition of pursuing component integration and a usage condition of the small mobility, business responsiveness and the like are improved by maximizing movement convenience through movement connectivity between a last mile and a purpose built vehicle (PBV) (realization of door-to-door transportation) and securing a small mobility storage space, usage flexibility of the personal mobility and the shared mobility and configuring a modular storage and withdrawal mechanism and a space in the PBV for securing connectivity between a personal mobility (PM) (personal small mobility), the PBV, a Hub, and a urban air mobility (UAM).

In accordance with a storage vehicle for a small mobility according to various exemplary embodiments of the present invention, when a passenger gets off a vehicle and transfers from a small mobility to the storage vehicle, a passenger can store the used small mobility in an internal space of the storage vehicle and use the small mobility again, a storage slot configured for storing the small mobility may be formed in the internal space of the storage vehicle, in which the passenger rides, using a space below a seat, and the small mobility may be stored in the storage slot on a lower end portion of a passenger seat and thus a battery of the small mobility may be charged.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by multiple control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A storage vehicle for a mobility, the storage vehicle comprising:
   a seat provided inside the storage vehicle and spaced from a floor of the storage vehicle upward to form a separation space below the seat;
   a storage slot formed in the separation space below the seat, opened to an external side of the storage vehicle through a portion of a sidewall of the storage vehicle, and configured to store the mobility therein;
   a door provided in the storage slot; and
   an opening/closing portion provided on a side of the door and configured to operate the door upward or downward to open or close the storage slot,
   wherein the door is provided on the sidewall of the storage vehicle to form a portion of the sidewall and has a shape extending from an upper end portion of the seat to the floor of the vehicle.

2. The storage vehicle of claim 1, wherein an end of the door is pivotally connected to the seat to selectively close the storage slot.

3. The storage vehicle of claim 1,
   wherein the seat is disposed to direct a seatback to face the external side of the storage vehicle,
   wherein the seatback is located at a position spaced from the sidewall of the storage vehicle to form an interspace between the seatback and the sidewall of the storage vehicle, and
   wherein a separation space, which is formed so that a seat cushion is spaced from the floor of the storage vehicle upward, is connected to the interspace.

4. The storage vehicle of claim 3,
   wherein the storage slot is provided in each of the separation space and the interspace,
   wherein when the mobility is stored, a scaffold of the mobility is located in the separation space, and
   wherein a handle of the mobility is located in the interspace.

5. The storage vehicle of claim 1,
   wherein the door includes an upper end portion and a lower end portion;
   wherein the opening/closing portion slides the upper end portion of the door upward or downward, and
   wherein when the upper end portion of the door slides upward, the lower end portion of the door is rotated to the external side of the storage vehicle to connect the floor of the storage vehicle to the ground, assisting storage of the mobility into the storage slot or withdrawal of the mobility out of the storage slot.

6. The storage vehicle of claim 1,
   wherein the door is provided to be rotatable based on one side thereof, and
   wherein the opening/closing portion rotates the door in a lateral direction to open or close the storage slot.

7. The storage vehicle of claim 1,
   wherein a fixing portion is provided at a lower end portion of the storage slot, and
   wherein when the mobility is stored in the storage slot, the fixing portion fixes the mobility, and when the opening portion is opened, the fixing portion releases the fixing.

8. The storage vehicle of claim 7, wherein, when the mobility is stored in the storage slot, the fixing portion locks wheels or a scaffold of the mobility to fix the mobility in the storage slot.

9. The storage vehicle of claim 1,
   wherein a charging portion is provided in the storage slot, and
   wherein when the mobility is stored in the storage slot, the charging portion charges a battery of the mobility.

10. A storage vehicle for a mobility, the storage vehicle comprising:
    a seat provided inside the storage vehicle and spaced from a floor of the storage vehicle upward to form a separation space below the seat;
    a storage slot formed in the separation space below the seat, opened to an external side of the storage vehicle through a portion of a sidewall of the storage vehicle, and configured to store the mobility therein;
    a door provided in the storage slot; and
    an opening/closing portion provided on a side of the door and configured to operate the door upward or downward to open or close the storage slot,
    wherein the opening/closing portion includes an actuator provided at an upper end portion of the door, and
    wherein as the actuator is rotated in a first direction or a second direction, the door slides upward or downward to open or close the storage slot.

11. The storage vehicle of claim 10,
    wherein the actuator is coupled to the door through a support extending from the actuator and connected on a center portion of the door, and
    wherein the support pushes the door to the external side of the storage vehicle to slide the door upward according to a rotation of the actuator or pulls the door to an internal side of the storage vehicle to slide the door downward.

12. A storage vehicle for a mobility, the storage vehicle comprising:
    a seat provided inside the storage vehicle and spaced from a floor of the storage vehicle upward to form a separation space below the seat;
    a storage slot formed in the separation space below the seat, opened to an external side of the storage vehicle through a portion of a sidewall of the storage vehicle, and configured to store the mobility therein;
    a door provided in the storage slot; and
    an opening/closing portion provided on a side of the door and configured to operate the door upward or downward to open or close the storage slot,
    wherein an auxiliary storage portion is provided at a lower end portion of the storage slot, and
    wherein when the door is opened, the auxiliary storage portion connects the floor of the storage vehicle to the ground to assist storage of the mobility into the storage slot or withdrawal of the mobility out of the storage slot.

13. The storage vehicle of claim 12, wherein the auxiliary storage portion has a shape of plate protruding from the lower end portion of the storage slot toward an upper end portion of the storage slot, a first end portion of the auxiliary storage portion is rotatably coupled to the floor, and a second end portion thereof is supported on the ground when rotated.

14. The storage vehicle of claim 13, wherein an elastic member is provided on an end portion of the auxiliary storage portion, and when the door is opened, the auxiliary storage portion is rotated to the external side of the storage vehicle due to an elastic force of the elastic member so that the second end portion of the auxiliary storage portion is supported on the ground.

15. The storage vehicle of claim 13,
wherein the auxiliary storage portion includes an actuator provided at the lower end portion of the storage slot, and
wherein as the actuator is rotated in a first direction or a second direction, the auxiliary storage portion rotates to open or close the storage slot.

* * * * *